United States Patent [19]

Zimmermann

[11] 3,947,170

[45] Mar. 30, 1976

[54] ROTARY FILM BLOWHEAD FOR MAKING TUBULAR FILMS OF THERMOPLASTIC MATERIAL

[75] Inventor: Werner Zimmermann, Lengerich, Germany

[73] Assignee: Windmoller & Holscher, Lengerich, Germany

[22] Filed: Apr. 3, 1975

[21] Appl. No.: 564,909

[30] Foreign Application Priority Data
Apr. 5, 1974 Germany............................ 2416758

[52] U.S. Cl............................ 425/72 R; 425/326 R
[51] Int. Cl.² ...................... B29F 3/00; B29D 23/04
[58] Field of Search...... 425/72, 326 R, 376 R, 378, 425/379, 381

[56] References Cited
UNITED STATES PATENTS

| | | |
|---|---|---|
| 3,176,347 | 4/1965 | Shaul................................ 425/72 |
| 3,445,891 | 5/1969 | Thordarson........................ 425/72 |
| 3,450,806 | 6/1969 | Matsuo et al...................... 425/72 X |
| 3,663,133 | 5/1972 | Augustin et al.................... 425/72 |
| 3,709,290 | 1/1973 | Upmeier............................ 425/72 X |
| 3,762,853 | 10/1973 | Upmeier............................ 425/326 |
| 3,898,028 | 8/1975 | Upmeier............................ 425/326 |

FOREIGN PATENTS OR APPLICATIONS

| | | |
|---|---|---|
| 1,046,870 | 12/1958 | Germany |
| 854,368 | 11/1960 | United Kingdom |

Primary Examiner—J. Howard Flint, Jr.
Attorney, Agent, or Firm—Fleit & Jacobson

[57] ABSTRACT

A rotary blowhead for making tubular plastics film and comprising interior and exterior air cooling means is adapted to be centrally fed with plastics material from a stationary extruder and is connected to stationary air fans by means of segmented air distributing means.

7 Claims, 1 Drawing Figure

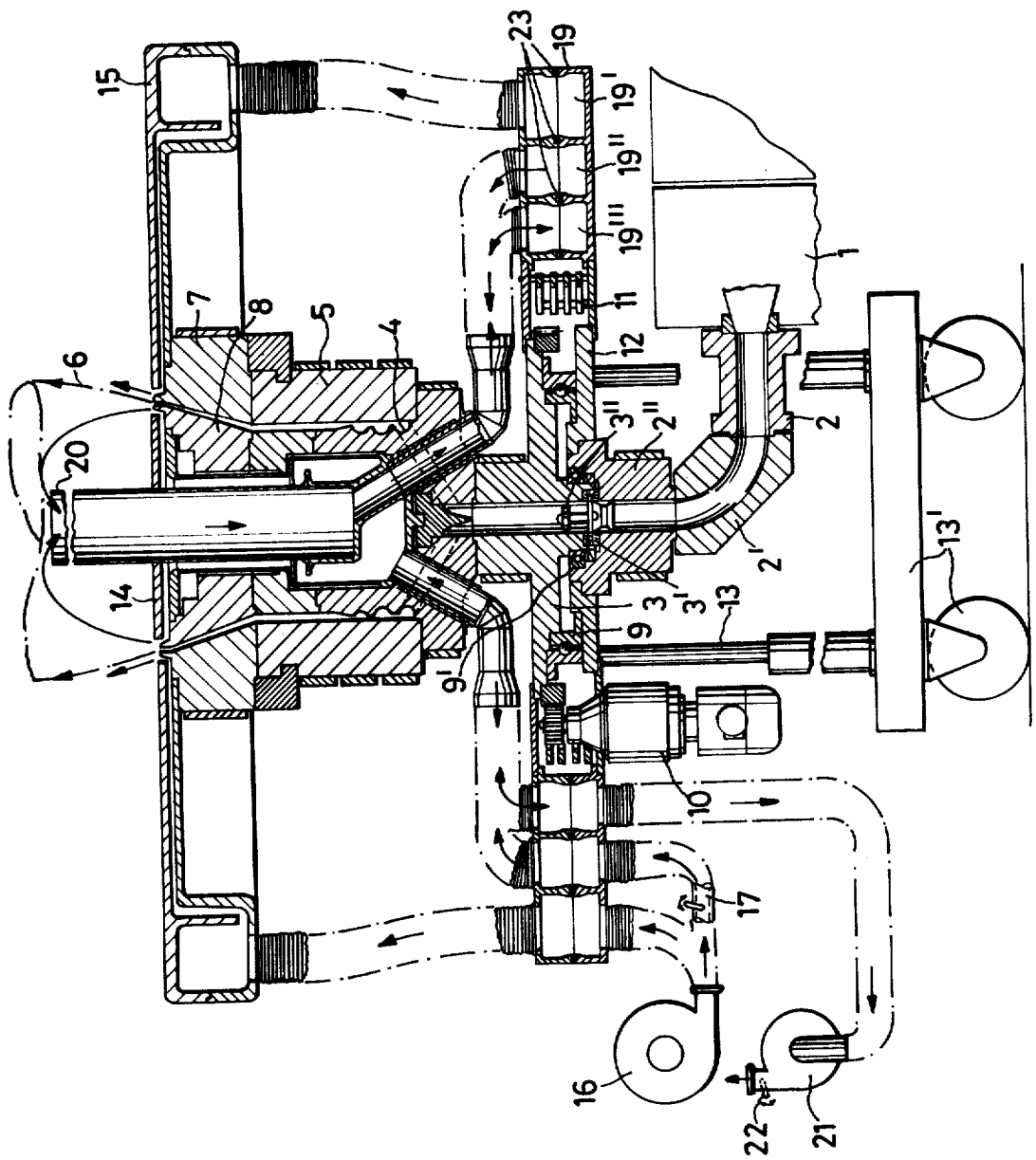

ROTARY FILM BLOWHEAD FOR MAKING TUBULAR FILMS OF THERMOPLASTIC MATERIAL

The invention relates to a rotary film blowhead fed centrally with thermoplastic material for making tubular film, comprising film cooling means with interior and exterior cooling rings and air supply connectors, said blowhead being rotatably connected to the stationary extruder. In the manufacture of films from thermoplastic materials, it will be known that thickness variations are unavoidable. When coiling such films exhibiting fluctuations in thickness, the thicker film portions have a cumulative effect and form annular beads on the coil, these causing a permanent deformation of the film in this region. After uncoiling, such a film will no longer lie completely flat and this makes the printing and processing of the film to packaging means or like products more difficult.

In the manufacture of tubular films by the blowing method and of flat films formed by the longitudinally severing a tubular film, the annular beads on the coils and the disadvantages caused thereby can be avoided if relative rotation is brought about between the film blowhead on the one hand and the flattening and take-off apparatus on the other hand. Such rotation can be continuous or oscillating, with reversal in the direction of rotation after every 360°. These rotary movements spread the thickness errors over the entire width of the coil in much the same way as a rope is coiled on a drum, whereby cylindrical coils without annular beads are created.

To achieve the relative rotation between the film blowhead and the flattening and take-off apparatus, it is known to mount the blowhead, with or without the extruder, for continuous or oscillating rotation.

An improved distribution of thickness errors in the film to make cylindrical coils is achieved by apparatus in which the film blowhead is stationary and the take-off apparatus is mounted for continuous or oscillating rotation through 360°, whereby all thickness errors in the film that might be caused by the extruder, the connector, the film blowhead, the film cooling rings as well as the room influences are distributed over the entire width of the coil. Such an oscillating flattening and take-off apparatus for tubular webs of plastics film is known from German Specification No. 2,035,584. Blown film extruder installations equipped with this known apparatus make it possible to obtain at high production rates large-diameter coils of film that are free from beads.

In the production of blown film having a very large width in the flattened condition, for example covering foils used in the building industry and in agriculture, it has been found that the expense for an oscillating take-off apparatus with a system of turning bars downstream thereof is unjustifiably large, particularly because of the large roller widths that are involved, and that the operation of such a large installation is made very difficult, especially when threading the tubular film into the apparatus on commencement of operation.

The manufacture of blown film with a large width in the flattened condition and at high production capacities requires the use of interior film cooling means. These can be provided without difficulty for blown film extruder installations with oscillating take-off means because the blowhead is stationary.

If only for reasons of weight, it is not usual in the manufactur of blown film having a large width in the flattened condition to produce large-diameter coils, so that, because of the small number of film convolutions in the coil, it is not necessary to install an expensive oscillating film take-off apparatus. The quality of coiling that can be achieved with rotary film blowheads is quite adequate for such films having a large width in the flattened condition. However, a particular problem with the rotary film blowheads arises out of the connection of the supply of cooling and blowing air.

The aim of the present invention is therefore to provide a rotary film blowhead to which the cooling and blowing air can be supplied in a simple manner so that interior film cooling will also be possible.

In a film blowhead of the aforementioned kind, this aim is fulfilled in accordance with the invention in that the individual co-rotating air supply connectors are connected to the stationary blowers by segmented relatively rotatable air distributing rings which are sealed by sealing elements and of which the portion connected to the blowers is stationary. The rotary film blowhead according to the invention can be equipped with interior film cooling means so that even blown films having a large width in the flattened condition can be adequately cooled at high production rates. Although rotary film blowheads cannot be effective in distributing over the width of the film the one-sided room influences on the neck of the film that is still soft, this is not disadvantageous with the small coil diameters that are here involved. Such room influences may continue to be markedly reduced by avoiding draughts.

Advantageous embodiments of the invention are described in more detail in the subsidiary claims.

An example of the invention will be described in more detail with reference to the drawing in which the single FIGURE is a diagrammatic section through a rotary film blowhead with cooling and blowing air supply.

The molten material fed from an extruder that is diagrammatically indicated at 1 is led through the connector 2, the elbow 2' and the connector 2'' via the rotary member 3 into the distributing passages 4 of the film blowhead 5 and from these it is formed into the tubular film 6 by way of the nozzle rings 7, 8. The rotary member 3 is mounted by means of the bearings 9, 9' on the supporting plate 12 which, in turn, is carried by the supporting carriage 13, 13'. The rotary motion of the film blowhead is brought about by the geared motor 10.

Rotating together with the film blowhead there is an interior cooling apparatus which is diagrammatically indicated at 14 for the exchange of cooling air in the film bubble, and the outer cooling ring 15. The connection of the co-rotating cooling apparatuses 14, 15 to the stationary main blower 16 having the throttle flap 17 for controlling the degree of inflation by means of the quantity of interior air, as well as to the suction blower 21 having the throttle flap 22 for influencing the amount of interior cooling air, takes place in accordance with the invention by way of the segmented, relatively rotatable, concentric air distributing chambers 19 to 19''' which are arranged at approximately the same height as the rotary apparatus 3, 3' and from which, as diagrammatically illustrated by the flow arrows, the different supply points are connected through flexible hoses. The dividing planes of the concentric air chambers 19 are sealed from one another by suitable sealing elements 23 so that in this region there will be no mixing of the cooling air and no loss of air. The rotary air chamber 19' serves to supply air to the exterior cooling ring 15, the air chamber 19" to supply the connectors for the interior cooling air supply as well as the air chamber 19''' for connecting the hot air suction connectors which lead the heated air out of the tubular film bubble through the pipe 20.

It is desirable to supply current to the rotary heated head portions in known manner by way of the slip rings 11, the temperature regulators preferably being mounted on the co-rotating part of the air supply chambers 19. This avoids the need for likewise leading the sensitive temperature measuring lines through a rotary connection to a stationary regulator.

Compared with known rotary film blowheads, the arrangement according to the invention of the film blowhead with interior cooling apparatus and the cooling apparatuses, one achieves that, except for the room influence, all possibilities of errors having an effect on the tubular film will rotate about the longitudinal axis of the film. Temperature errors possibly arising out of the connector 2 to 2' over the cross-section of the supply bore for the molten material can be evened out by a mixing tool 3" provided beyond the rotary sealing position.

The illustrated example of the air distributing chambers 19' to 19''' confronting one another at a radial dividing plane is a particularly advantageous form of the cooling air rotary connection. It is, however, readily possible to provide such a rotary connection with a different arrangement of the dividing plane.

I claim:

1. A rotary film blowhead fed centrally with thermoplastic material for making tubular film, comprising film cooling means with interior and exterior cooling rings and air supply connectors, said blowhead being rotatably connected to a stationary extruder, characterised in that the individual co-rotating air supply connectors are connected to the stationary blowers (16, 21) by segmented relatively rotatable air distributing rings (19, 19', 19", 19''') which are sealed by sealing elements (23) and of which the portion connected to the blowers (16, 21) is stationary.

2. A blowhead according to claim 1, characterised in that the exterior cooling ring (15) rotates with the blowhead.

3. Apparatus according to claim 1, characterised in that concentric relatively rotatable air chamber rings are mounted at the level of the rotary apparatus for the film blowhead, through which the cooling air supply to the outer ring, the cooling air supply to the interior cooling apparatus as well as the withdrawal of heated air takes place.

4. A blowhead according to claim 1, characterised in that the rotary portion of the film blowhead with cooling means is oscillatingly rotatable by means of a geared motor (10).

5. A blowhead according to claim 1, characterised in that a mixing tool (3") for evening out the temperatures in the stream of supplied molten material is mounted beyond the rotary sealing means (3').

6. A blowhead according to claim 1, characterised in that the current supply for the rotating parts takes place in known manner through slip rings (11) and the regulators for the heating zones are mounted on the rotating part of the air distributing chambers (19).

7. A blowhead according to claim 1, characterised in that the throttle flats (17, 22) necessary for controlling the degree of inflation are mounted on the stationary parts of the air supply means.

* * * * *

Notice of Adverse Decision in Interference

In Interference No. 99,744, involving Patent No. 3,947,170, W. Zimmermann, ROTARY FILM BLOWHEAD FOR MAKING TUBULAR FILMS OF THERMOPLASTIC MATERIAL, final judgment adverse to the patentee was rendered Dec. 19, 1979, as to Claim 1.

[*Official Gazette, April 29, 1980.*]